Patented Oct. 27, 1931

1,829,188

UNITED STATES PATENT OFFICE

FRIEDRICH RÜSBERG, OF BERLIN-NIEDERSCHONEWEIDE, AND PAUL SCHMID, OF BERLIN-BAUMSCHULENWEG, GERMANY, ASSIGNORS TO KALÏ-CHEMIE AKTIEN-GESELLSCHAFT, OF BERLIN, GERMANY

MAKING BARIUM SULPHIDE

No Drawing. Application filed July 22, 1929, Serial No. 380,250, and in Germany August 7, 1928.

This invention relates to the manufacture of barium sulphide by reducing heavy spar in revolving furnaces.

The object of the invention is to provide a method for making barium sulphide by reducing heavy spar, having in its natural state a visible crystalline structure.

It is known in the art, that many of the natural heavy spars, although very rich in barium sulfate, cannot be used for the manufacture of barium sulphide, as they do not agglomerate during the reduction process, thus obtaining a loose and powdered final product, which is not thoroughly reduced. This is especially the case when reducing the heavy spar in a revolving furnace. The raw material then adheres to the furnace wall and leads to the formation of rims, thus disturbing or even preventing the reduction process.

We have found that all these disadvantages are occurring with heavy spars having a visible crystalline structure in their natural state and can be avoided when decrepitation of these heavy spars is prevented during the reduction process. There are a number of methods for preventing decrepitation of these heavy spars during the reduction process. Thus for example decrepitation of these visibly crystalline heavy spars during the reduction process is prevented by a pre-treatment of the heavy spar, which may be a calcination to produce decrepitation, before the material is subjected to the reduction process, or a disintegration to a state in which no crystalline structure is visible any more. The calcination pre-treatment is carried out at temperatures which at least lead to decrepitation of the crystalline heavy spar, which is for example the case at temperatures of about 600 to 700° C. The disintegration of the visibly crystalline heavy spar to a state, in which the crystalline structure is not visible any more, must be carried out to a powder, the particles of which have a diameter not materially exceeding 0.2 mm. Also the addition of aqueous solutions of electrolytes such as acids, acid salts, salts or mixtures of these substances to the visibly crystalline heavy spar is suitable for preventing its decrepitation during the reduction process. Also any other treatment or method preventing decrepitation during the reduction process is suitable for the purpose in question.

Examples

1. Heavy spar of middle-German origin, having a visible crystalline structure and being unsuitable for reduction in a revolving furnace according to the usual and known methods, is coarsely ground and calcinated at temperatures of about 600 to 700° C., at which decrepitation takes place. The calcinated material is then disintegrated to a fineness of 3 mm. grain size and mixed with the necessary amount of reducing coal. This mixture is reduced in the usual manner in a revolving furnace no difficulties arising. The obtained barium sulphide contains 82% of BaS.

2. The same heavy spar as in Example 1 is disintegrated to a powder free from considerable amounts of particles with a greater diameter than 0.2 mm. This powder is mixed with the necessary amount of reducing coal and reduced in a revolving furnace. The barium sulphide obtained contains 85.5% of BaS.

3. 100 kg. of the same heavy spar as in Example 1 ground to a fineness of about 3 mm. grain size are mixed with 8 liter of water and 1. kg. of sulfuric acid of 60° Bé. or 1 kg. of sodium bisulfate. Then the necessary amount of reducing coal is added to the mixture and the obtained mixture is heated in a revolving furnace. The barium sulphide obtained contains 82% of BaS.

If the same heavy spar is mixed with coal, without adding the sulfuric acid and the mixture heated in a revolving furnace, no agglomeration takes place during the reduction and it is difficult to remove the mixture from the furnace.

4. The same good results as in Example 3 with sulfuric acid are obtained when 3 kg. of a 30% calcium chloride solution are used as addition to the heavy spar instead of sulfuric acid.

The foregoing detailed description has been given for clearness of understanding only, and no unnecessary limitations should be understood therefrom, but the appended claim should be construed as broadly as permissible in view of the prior art.

We claim:

A method for making barium sulphide from heavy spar with visible crystalline structure which consists in disintegrating the heavy spar to a powder of a fineness of at least 0.2 mm. mixing the disintegrated heavy spar with reducing coal, forming into briquets, and heating this mixture in a revolving furnace to reduction temperatures.

In testimony whereof we affix our signatures.

FRIEDRICH RÜSBERG.
PAUL SCHMID.